United States Patent [19]
White

[11] Patent Number: 6,125,781
[45] Date of Patent: Oct. 3, 2000

[54] TUNNEL-HULLED BOAT

[76] Inventor: Ralph Fern White, P.O. Box 314, Blountstown, Fla. 32424

[21] Appl. No.: 09/127,277

[22] Filed: Jul. 31, 1998

[51] Int. Cl.[7] ....................................................... B63G 1/32
[52] U.S. Cl. .......................................... 114/288; 114/67 A
[58] Field of Search ..................... 114/289, 288, 114/271, 291, 67 A

[56] References Cited

U.S. PATENT DOCUMENTS

| | | | |
|---|---|---|---|
| Re. 33,165 | 2/1990 | Whitehead | 440/69 |
| D. 334,011 | 3/1993 | Biel et al. | D12/310 |
| D. 367,462 | 2/1996 | Lorenzen | D12/318 |
| 3,289,623 | 12/1966 | Gray et al. | 114/67 A |
| 3,937,173 | 2/1976 | Stuart | 115/39 |
| 4,091,761 | 5/1978 | Fehn | 114/290 |
| 4,392,448 | 7/1983 | Shirley | 114/271 |
| 4,652,245 | 3/1987 | May | 440/69 |
| 4,685,889 | 8/1987 | Nystrom | 440/69 |
| 4,689,026 | 8/1987 | Small | 440/66 |
| 4,713,028 | 12/1987 | Duff | 440/61 |
| 4,907,520 | 3/1990 | Pipkorn | 114/61 |
| 4,915,668 | 4/1990 | Hardy | 440/69 |
| 4,951,591 | 8/1990 | Coles | 114/274 |
| 4,977,845 | 12/1990 | Rundquist | 114/289 |
| 5,191,849 | 3/1993 | Labrucherie et al. | 114/61 |
| 5,249,994 | 10/1993 | Finkl | 440/79 |
| 5,350,327 | 9/1994 | Self et al. | 440/66 |
| 5,474,014 | 12/1995 | Russell | 114/288 |
| 5,497,722 | 3/1996 | English, Sr. | 114/62 |
| 5,570,650 | 11/1996 | Harley | 114/289 |

*Primary Examiner*—Ed Swinehart
*Attorney, Agent, or Firm*—Peter Loffler

[57] ABSTRACT

A tunnel-hulled boat that has a high degree of maneuverability at low and high speeds with decreased hydrodynamic drag is disclosed. The tunnel-hulled boat is maneuverable in shallow water and when proceeding in reverse. The tunnel-hulled boat is comprised of a hull having a generally square-nosed and notched aft and generally concave tunnel disposed from proximate amidships to the aft, with the concavity increasing as the tunnel proceeds aftward. A first set of bevels having increasing diameter extend along either side of the tunnel while a second set of bevels are each disposed within a respective one of the first set of bevels proximate the transom of the boat. A pair of sponsons are attached to the transom on either side of the tunnel.

95 Claims, 5 Drawing Sheets

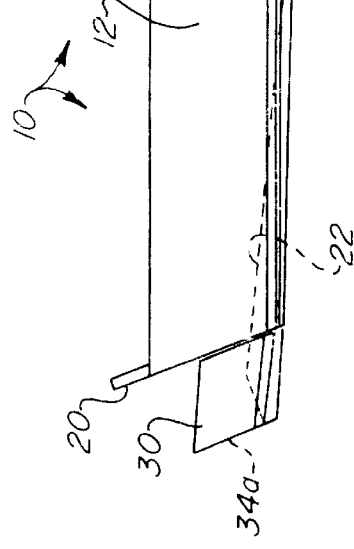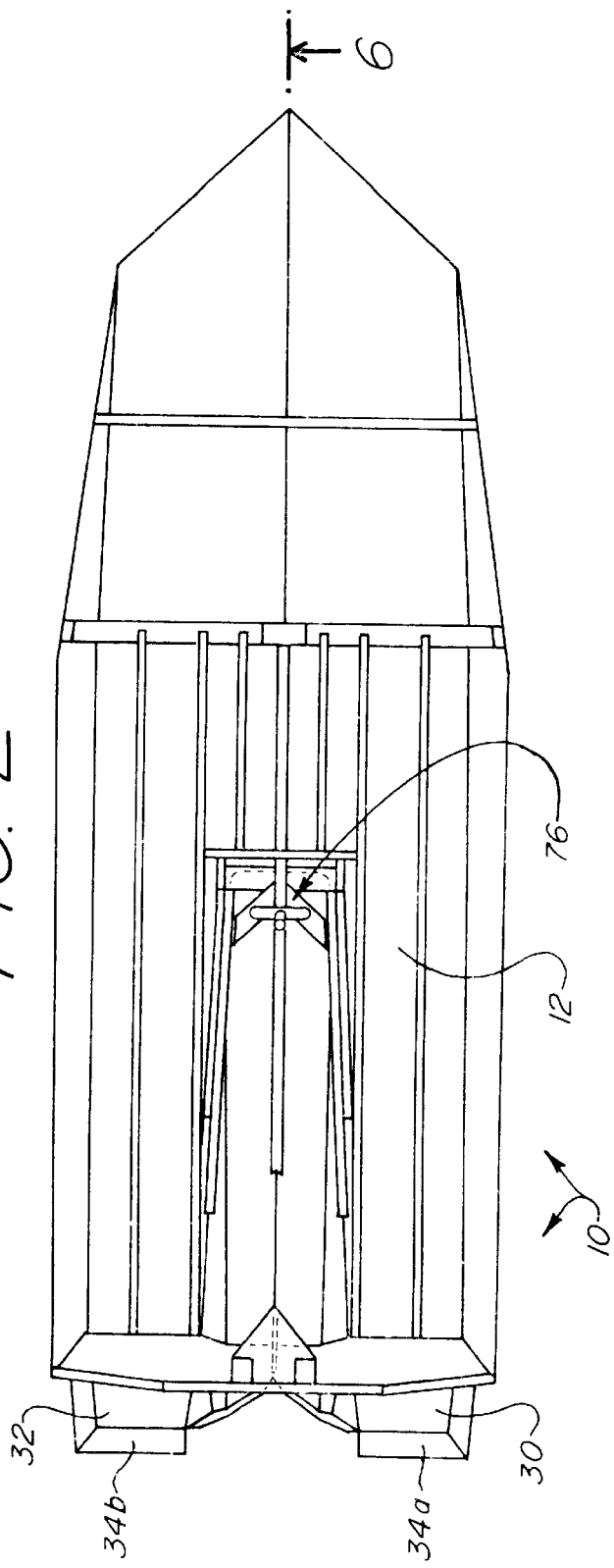

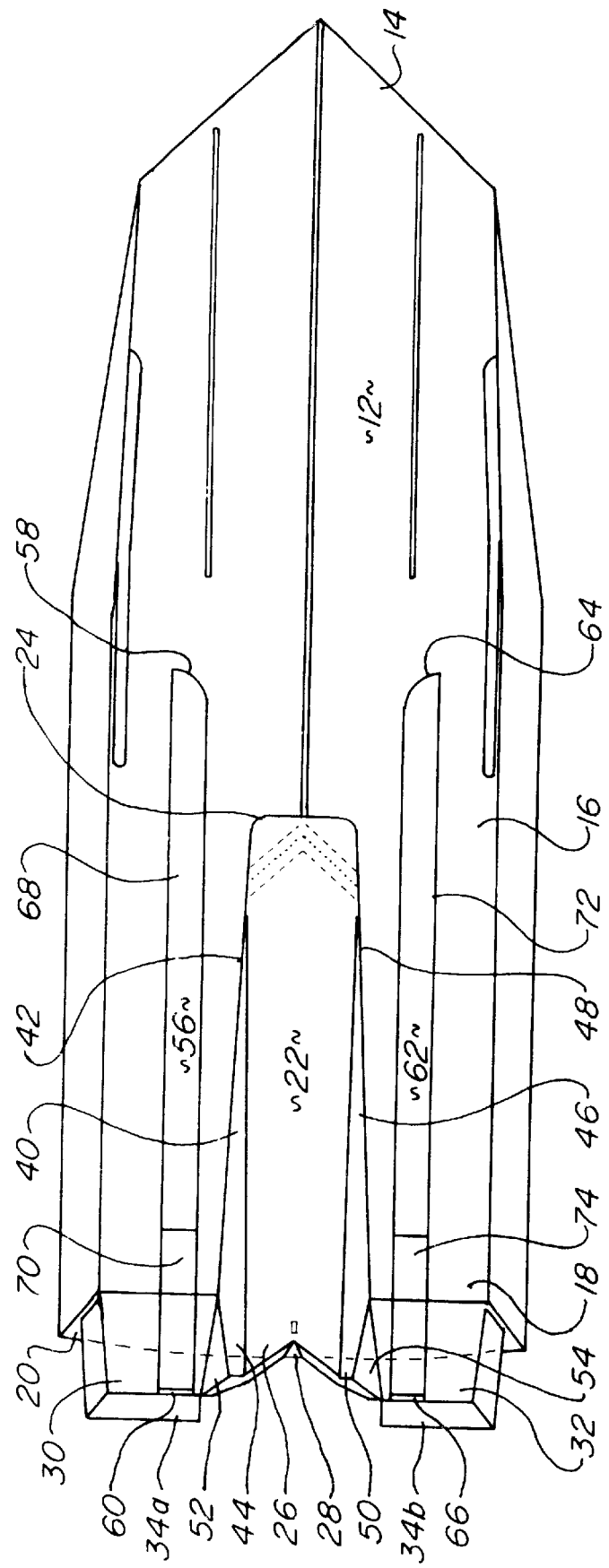

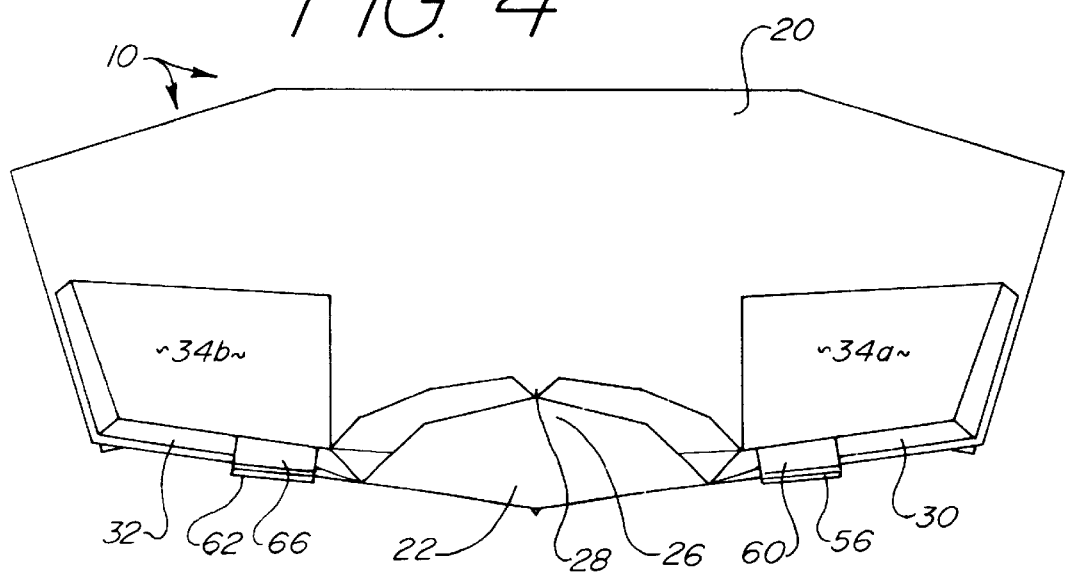
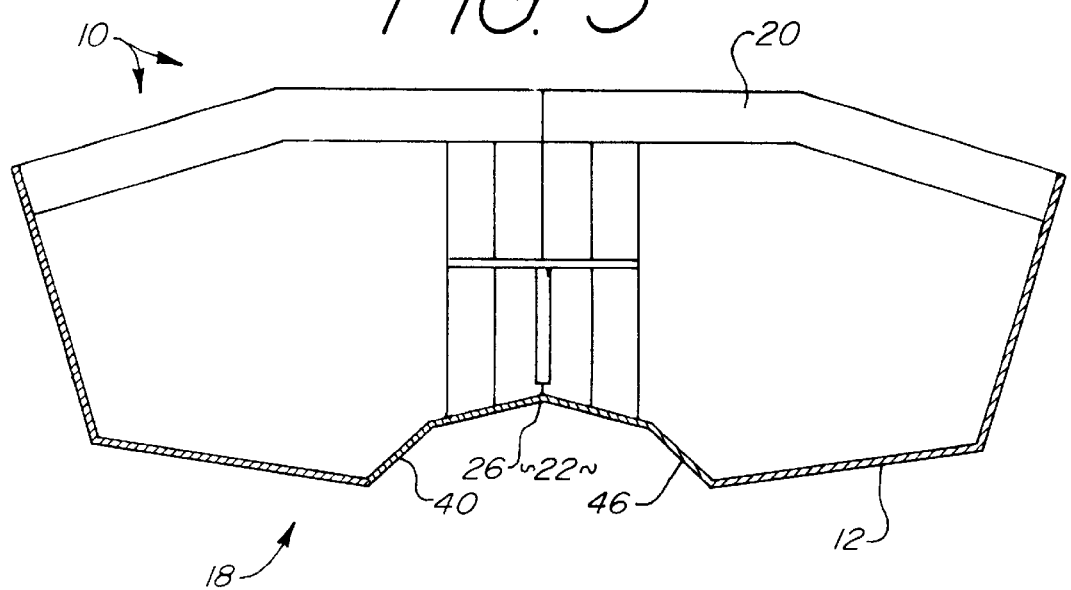

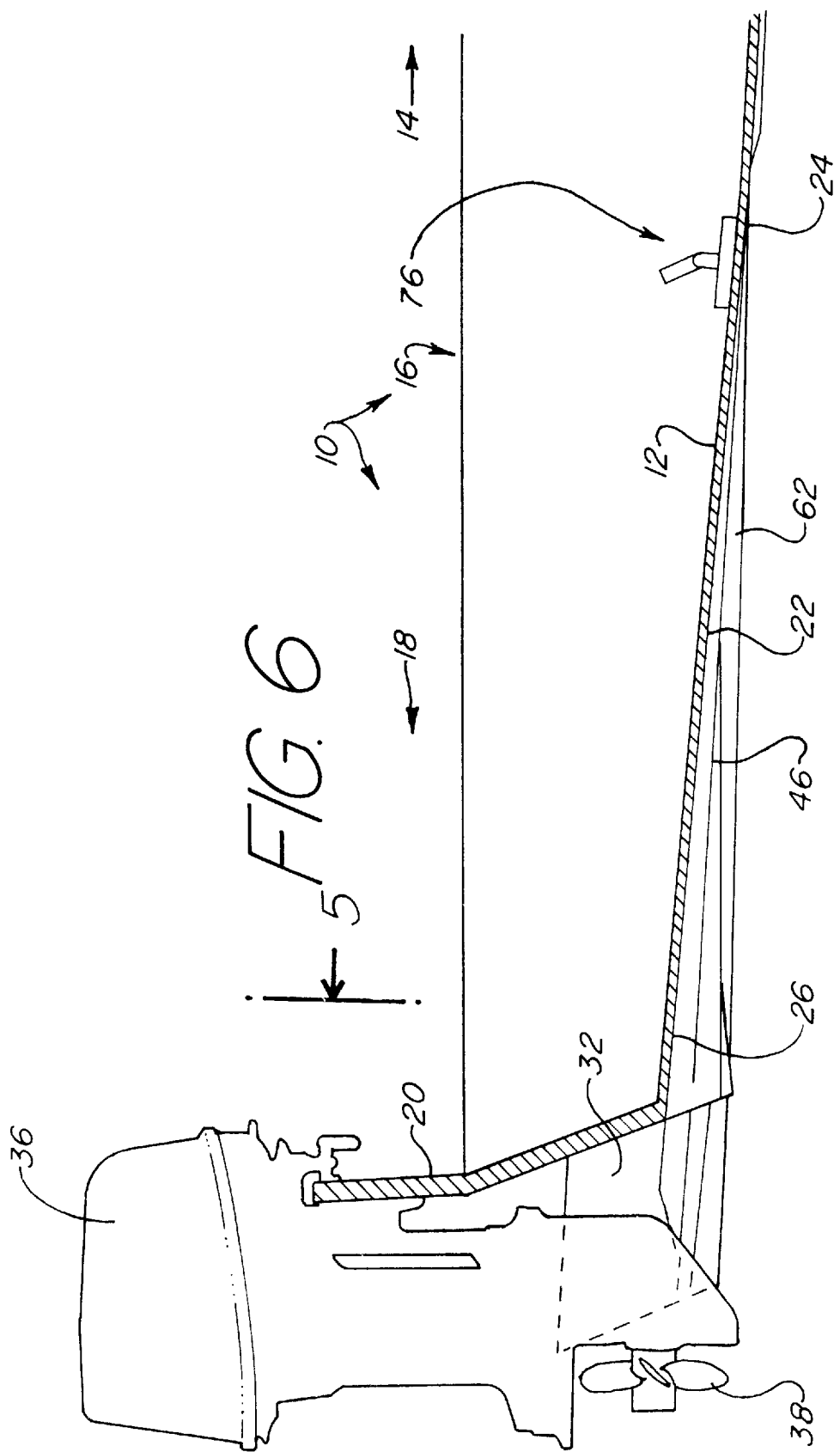

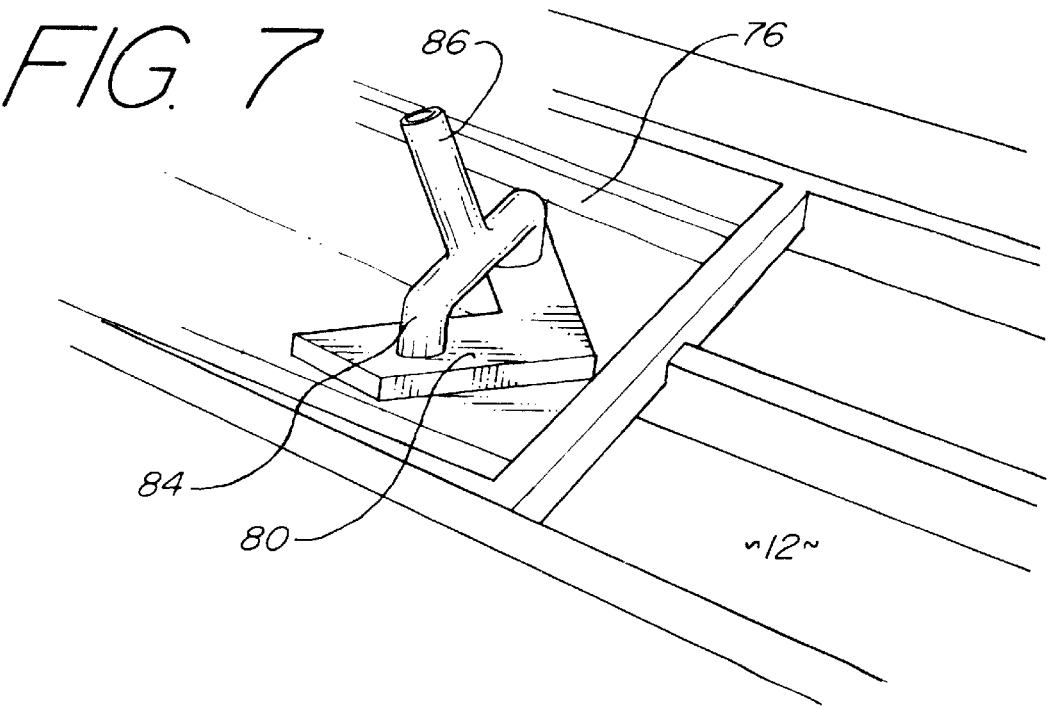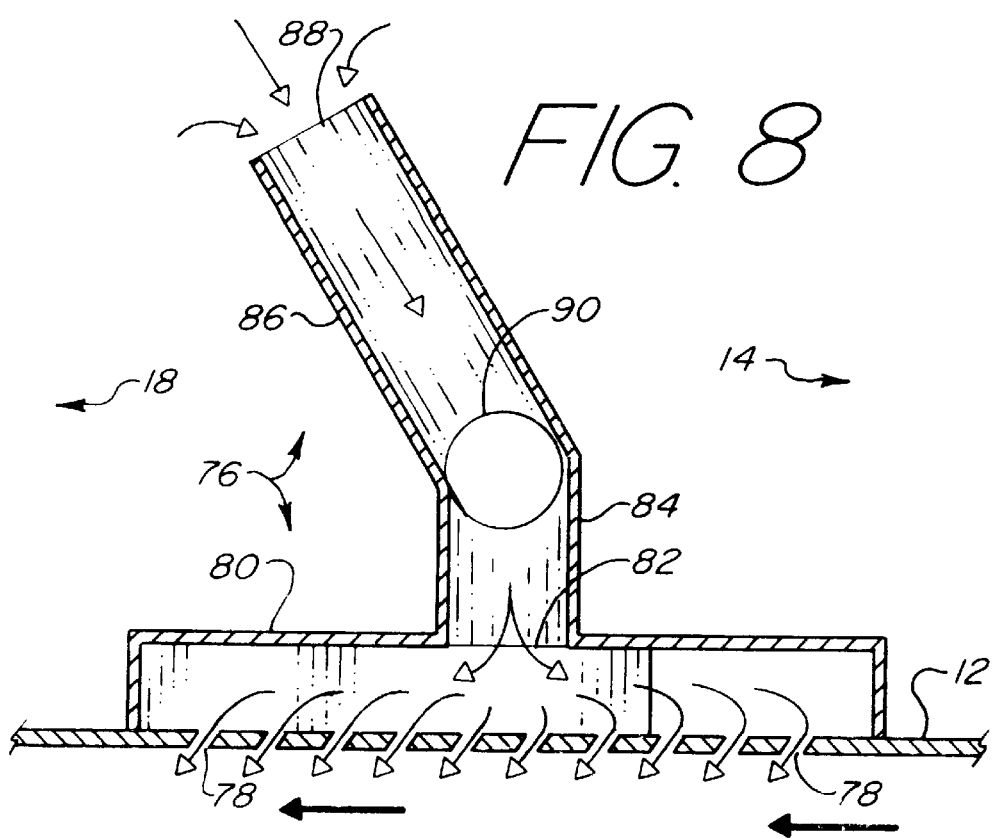

TUNNEL-HULLED BOAT

BACKGROUND OF THE INVENTION

1. Field of the Invention

The present invention relates to a tunnel-hulled boat having aeration capability.

2. Background of the Prior Art

Tunnel-hulled boats are known in the art. By providing one or more tunnels within a boat's hull improves one or more operating characteristics of the boat. Various designs and considerations have been taught with varying degrees of achievement. However, no prior art design has disclosed a tunnel-hulled boat design that greatly improves the operating characteristics of the boat in most modes of operation including fast speed, slow speed, gradual and sharp turning, shallow water operation and backing procedures or in most water conditions.

Therefore, there is a need in the art for a tunnel-hulled boat that improves the operating characteristics of the boat in most modes of operation and under various sea conditions. Such a tunnel-hulled boat should be of relatively simple and straightforward design employing standard methods of manufacture to build.

SUMMARY OF THE INVENTION

The tunnel-hulled boat of the present invention addresses the aforementioned needs in the art. The present invention provides for a tunnel-hulled boat that improves the operating characteristics of a boat at fast speeds and in slow speeds and in gradual as well as sharp turns. The present invention allows the boat to achieve strong performance characteristics in shallow water as well as during backing procedures. These performance improvements are achieved under various sea conditions. The tunnel-hulled boat is not unduly complex in design and is constructed using standard manufacturing techniques.

The tunnel-hulled boat of the present invention is comprised of a hull having a fore, an amidships, and an aft with a transom attached thereto proximate the aft. A generally concave tunnel, having a generally rectangular nose and a pair of opposing sides with a first bevel on each side, is disposed within the hull extending rearwardly from the amidships. The concavity of the tunnel increases during the rearward progression. The diameter of each bevel increases during rearward progression and a second bevel is disposed within each first bevel proximate the aft. The rearward portion of the tunnel has a generally V-shaped notch. A pair of sponsons, each having a diagonal end relative to the amidships of the hull, is attached to the transon on opposing sides of the tunnel. The combined buoyancy volume of the sponsons is greater than the buoyancy volume loss of the tunnel. A pair of lifting strakes, each having two portions disposed on different planes, is located on the hull on opposing sides of the tunnel. An aeration structure may be provided to introduce aeration into the tunnel during operation.

In operation, water enters the tunnel by passing over the nose. The generally rectangular nature of the nose assures that the water does not change direction during and after entry. Furthermore, the increasing concavity of the tunnel maintains the straight flow of water through the tunnel. Both of these factors decrease water flow turbulence through the tunnel thereby decreasing hydrodynamic drag and increasing performance. The bevels assist in turning at low and high speeds with the increasing nature of the first bevels helping deflect the water during the turn thereby increasing boat stability. Furthermore, the second set of bevels channel water to the first set of bevels during a backing operation thereby increasing the efficiency of the maneuver. The notch at the rear of the tunnel allows water to rise to furnish sufficient cooling water for motors without low water intakes. The sponsons replace the buoyancy volume lost to the tunnel to allow proper operation in shallow waters and during low speed operation. Furthermore, the diagonally disposed nature of the sponsons allow water to be thrust back underneath the boat instead of against the transom during a backing operation. The aeration device, which draws air into the tunnel via venturi action, lets the tunnel have air during operation thereby reducing hydrodynamic friction within the tunnel which improves fuel efficiency, increases speed without an increase in fuel consumption, allows the boat to run in shallower waters and increases maneuverability when backing.

BRIEF DESCRIPTION OF THE DRAWINGS

FIG. 1 is a side elevation of the tunnel-hulled boat of the present invention.

FIG. 2 is a top plan view of the tunnel-hulled boat.

FIG. 3 is a bottom plan view of the tunnel-hulled boat.

FIG. 4 is a rear elevation view of the tunnel-hulled boat.

FIG. 5 is a sectioned view of FIG. 1.

FIG. 6 is a close-up side view of a portion of the tunnel-hulled boat of the present invention.

FIG. 7 is a perspective view of the aeration mechanism.

FIG. 8 is a sectioned view of the aeration mechanism.

Similar reference numerals refer to similar parts throughout the several views of the drawings.

DESCRIPTION OF THE PREFERRED EMBODIMENT

Referring now to the drawings, it is seen that the tunnel-hulled boat of the present invention, generally denoted by reference numeral 10, is comprised of a hull 12 having a fore 14, an amidships 16 and an aft 18, as well as a top side and a bottom side. A transom 20 is attached to the hull 12 proximate the aft 18 in diagonal disposition relative to the amidships 16. A tunnel 22 having a generally square nose first end 24 and a second end 26, is disposed within the hull 12 and extends from the amidships 16 to the aft 18. As seen, the tunnel 22 is generally concave with the degree of concavity increasing from the first end 24 to the second end 26. The second end 26 of the tunnel has a notch 28 in a generally V-shape. A first sponson 30 is attached to the transom 20 on one side of the tunnel 22 while a second sponson 32 is attached the transom 20 on the opposing side of the tunnel 22. The ends 34a and 34b of each sponson 30 and 32 are disposed in diagonal orientation relative to the amidships 16. The first sponson 30 and the second sponson 32 have a combined buoyancy volume that is greater than the buoyancy volume of the tunnel 22. A motor 36 is attached to the transom 20 such that its drive propeller 38 is disposed rearwardly of the tunnel 22

A first bevel 40, having a first end 42 and a second end 44, extends along on a first side of the tunnel 22 while a second bevel 46, having a third end 48 and a fourth end 50, is disposed along a second side of the tunnel 22. As seen, the diameter of the first bevel 40 increases from its first end 42 to its second end 44, while the diameter of the second bevel 46 also increases from its third end 48 to its fourth end 50. A third bevel 52 is disposed within the first bevel 40 proximate its second end 44 while a fourth bevel 54 is disposed within the second bevel 46 proximate its fourth end 50.

A first lifting strake 56, having a rounded first end 58 and a second end 60, extends along the bottom side of the hull 12 from the amidships 16 to the aft 18 while a second lifting strake 62, having a rounded third end 64 and a fourth end 66, extends along the bottom side of the hull 12 from the amidships 16 to the aft 18. As seen, the first strake 56 has a first section 68 and a second section 70 disposed on a different plane relative to the plane of the first section 68 and the second strake 62 has a third section 72 and a fourth section 74 disposed on a different plane relative to the plane of the first section 72

An aeration mechanism 76 is secured to the hull 12. Specifically, the aeration mechanism 76 is comprised of a plurality of first apertures 78 disposed within the hull 12 proximate the first end 24 and extending in rearward diagonal fashion from the top side to the bottom side of the hull 12, a cover 80 having at least one second aperture 82, positioned over the plurality of first apertures 78, attached to the top side of the hull 12, at least one first tube 84 attached to the cover 80 each registerable with a respective one of the at least one second aperture 82 at least one second tube 86 having an open first end 88 and a second end 90 attached in air flow connection with each of the at least one first tube 84. The first apertures 78 are diagonally disposed relative to the hull, with the diagonal disposition extending rearwardly from the top side to the bottom side of the hull 12. The diagonal disposition should be at least approximately 30 degrees in order to assure proper venturi action of the aeration mechanism 76 during boat operation. A ball valve (not illustrated) must be installed so that air can flow into the tunnel and allow reduction of hydraulic friction.

While the invention has been particularly shown and described with reference to an embodiment thereof, it will be appreciated by those skilled in the art that various changes in form and detail may be made without departing from the spirit and scope of the invention.

I claim:

1. A tunnel-hulled boat comprising:
    a hull having a top side, a bottom side, a fore, an amidships, and an aft;
    a transom attached to the hull proximate the aft;
    a generally concave tunnel, having a first side, a second side, a first end and a second end that has a generally V-shaped notch, disposed within the hull and extending rearwardly from the amidships;
    a first bevel, having a first end and a second end, disposed along the first side; and
    a second bevel, having a first end and a second end, disposed along the second side.

2. The tunnel-hulled boat as in claim 1 wherein the degree of concavity of the tunnel increases from the first end to the second end.

3. The tunnel-hulled boat as in claim 1 wherein the first end is generally square.

4. The tunnel-hulled boat as in claim 1 wherein the cross-section of the first bevel increases from the first bevel's first end to the first bevel's second end and the cross-section of the second bevel increases from the second bevel's first end to the second bevel's second end.

5. The tunnel-hulled boat as in claim 1 further comprising:
    a third bevel disposed within the first bevel proximate the first bevel's second end; and
    a fourth bevel disposed within the second bevel proximate the second bevel's second end.

6. The tunnel-hulled boat as in claim 1 further comprising:
    a first sponson having a first end attached to the transom proximate the second end of the first bevel and a second end; and
    a second sponson having a first end attached to the transom proximate the second end of the second bevel and a end.

7. The tunnel-hulled boat as in claim 6 wherein the second end of the first sponson and the second end of the second sponson are each diagonally disposed relative to the amidships.

8. The tunnel-hulled boat as in claim 6 wherein the tunnel has a first buoyancy volume and the first sponson and the second sponson have a combined second buoyancy volume that is at least as great as the first volume.

9. The tunnel-hulled boat as in claim 7 further comprising:
    a third bevel disposed between the first bevel and the first sponson; and
    a fourth bevel disposed between the second bevel and the second sponson.

10. The tunnel-hulled boat as in claim 1 further comprising an aeration means for proving aeration for the tunnel.

11. The tunnel-hulled boat as in claim 10 wherein the aeration means comprises:
    a plurality of first apertures disposed within the hull proximate the first end;
    a cover having at least one second aperture, positioned over the plurality of first apertures, attached to the top side;
    at least one first tube attached to the cover and registerable with a respective one of the at least one second aperture; and
    at least one second tube having a first end that is open and a second end attached in air flow connection with each of the at least one first tube.

12. The tunnel-hulled boat as in claim 11 wherein each of the plurality of first apertures is diagonally disposed relative to the amidships.

13. The tunnel-hulled boat as in claim 1 further comprising:
    a first lifting strake, having a first end and a second end, extending along the hull in spaced apart relation to the first side; and
    a second lifting strake, having a first end and a second end, extending along the hull in spaced apart relation to the second side.

14. The tunnel-hulled boat as in claim 13 wherein the first end of the first lifting strake and the first end of the second lifting strake are each rounded.

15. The tunnel-hulled boat as in claim 13 wherein the first lifting strake has a first section disposed on a first plane and a second section disposed on a second plane that is different relative to the first plane of the first section and the second lifting strake has a first section disposed on a third plane and a second section disposed on a fourth plane that is different relative to the third plane of the first section.

16. A tunnel-hulled boat comprising:
    a hull having a top side, a bottom side, a fore, an amidships, and an aft;
    a transom attached to the hull proximate the aft;
    a tunnel, having a first side, a second side, a first end and a second end, disposed within the hull and extending rearwardly from the amidships;
    a plurality of first apertures disposed within the hull proximate the first end and diagonally oriented relative to the amidships;

a cover having at least one second aperture, positioned over the plurality of first apertures, attached to the top side;

at least one first tube attached to the cover and aligned with a respective one of the at least one second aperture; and at least one second tube having a first end that is open and a second end attached in air flow connection with each of the at least one first tube.

17. The tunnel-hulled boat as in claim 16 wherein each of the plurality of first apertures is diagonally disposed relative to the amidships.

18. The tunnel-hulled boat as in claim 16 wherein the tunnel is generally concave.

19. The tunnel-hulled boat as in claim 18 wherein the degree of concavity of the tunnel increases from the first end to the second end.

20. The tunnel-hulled boat as in claim 16 further comprising:

a first bevel, having a first end and a second end, disposed along the first side; and a second bevel, having a first end and a second end, disposed along the second side.

21. The tunnel-hulled boat as in claim 20 wherein the cross-section of the first bevel increases from the first bevel's first end to the first bevel's second end and the cross-section of the second bevel increases from the second bevel's first end to the second bevel's second end.

22. The tunnel-hulled boat as in claim 16 wherein the first end is generally square.

23. The tunnel-hulled boat as in claim 16 wherein the second end is notched.

24. The tunnel-hulled boat as in claim 23 wherein the notch is generally V-shaped.

25. The tunnel-hulled boat as in claim 20 further comprising:

a third bevel disposed within the first bevel proximate the first bevel's second end; and a fourth bevel disposed within the second bevel proximate the second bevel's second end.

26. The tunnel-hulled boat as in claim 16 further comprising:

a first sponson having a first end attached to the transom and a second end; and a second sponson having a first end attached to the transom and a second end.

27. The tunnel-hulled boat as in claim 26 wherein the second end end of the first sponson and the second end of the second sponson are each diagonally disposed relative to the amidships.

28. The tunnel-hulled boat as in claim 16 wherein the tunnel has a first buoyancy volume and the first sponson and the second sponson have a combined second buoyancy volume that is at least as great as the first volume.

29. The tunnel-hulled boat as in claim 26 further comprising:

a first bevel, having a first end and a second end, disposed along the first side; and a second bevel, having a fifth end and a sixth end, disposed along the second side.

30. The tunnel-hulled boat as in claim 29 further comprising:

a third bevel disposed between the first bevel and the first sponson; and a fourth bevel disposed between the second bevel and the second sponson.

31. The tunnel-hulled boat as in claim 16 further comprising:

a first lifting strake, having a first end and a second end, extending along the hull in spaced apart relation to the first side; and a second lifting strake, having a first end and a second end, extending along the hull in spaced apart relation to the second side.

32. The tunnel-hulled boat as in claim 31 wherein the first end of the first lifting strake and the first end of the second lifting are each rounded.

33. The tunnel-hulled boat as in claim 31 wherein the first lifting strake has a first section disposed on a first plane and a second section disposed on a second plane that is different relative to the first plane of the first section and the second lifting strake has a first section disposed on a third plane and a second section disposed on a fourth plane that is different relative to the third plane of the first section.

34. A tunnel-hulled boat comprising:

a hull having a top side, a bottom side, a fore, an amidships, and an aft;

a transom attached to the hull proximate the aft;

a generally concave tunnel, having a first side, a second side, a first end and a second end, disposed within the hull and extending rearwardly from the amidships;

a first bevel, having a first end and a second end, disposed along the first side;

a second bevel, having a first end and a second end, disposed along the second side;

a third bevel disposed within the first bevel proximate the first bevel's second end; and a fourth bevel disposed within the second bevel proximate the second bevel's second end.

35. The tunnel-hulled boat as in claim 34 wherein the degree of concavity of the tunnel increases from the first end to the second end.

36. The tunnel-hulled boat as in claim 34 wherein the first end is generally square.

37. The tunnel-hulled boat as in claim 34 wherein the cross-section of the first bevel increases from the first bevel's first end to the first bevel's second end and the cross-section of the second bevel increases from the second bevel's first end to the second bevel's second end.

38. The tunnel-hulled boat as in claim 34 wherein the second end is notched.

39. The tunnel-hulled boat as in claim 38 wherein the notch is generally V-shaped.

40. The tunnel-hulled boat as in claim 34 further comprising:

a first sponson having a first end attached to the transom proximate the second end of the first bevel and a second end; and a second sponson having a first end attached to the transom proximate the second end of the second bevel and a end.

41. The tunnel-hulled boat as in claim 40 wherein the second end of the first sponson and the second end of the second sponson are each diagonally disposed relative to the amidships.

42. The tunnel-hulled boat as in claim 40 wherein the tunnel has a first buoyancy volume and the first sponson and the second sponson have a combined second buoyancy volume that is at least as great as the first volume.

43. The tunnel-hulled boat as in claim 41 further comprising:

a third bevel disposed between the first bevel and the first sponson; and a fourth bevel disposed between the second bevel and the second sponson.

44. The tunnel-hulled boat as in claim 34 further comprising an aeration means for proving aeration for the tunnel.

45. The tunnel-hulled boat as in claim 44 wherein the aeration means comprises:

a plurality of first apertures disposed within the hull proximate the first end;

a cover having at least one second aperture, positioned over the plurality of first apertures, attached to the top side;

at least one first tube attached to the cover and registerable with a respective one of the at least one second aperture; and at least one second tube having a first end that is open and a second end attached in air flow connection with each of the at least one first tube.

46. The tunnel-hulled boat as in claim 45 wherein each of the plurality of first apertures is diagonally disposed relative to the amidships.

47. The tunnel-hulled boat as in claim 34 further comprising:

a first lifting strake, having a first end and a second end, extending along the hull in spaced apart relation to the first side; and a second lifting strake, having a first end and a second end, extending along the hull in spaced apart relation to the second side.

48. The tunnel-hulled boat as in claim 47 wherein the first end of the first lifting strake and the first end of the second lifting strake are each rounded.

49. The tunnel-hulled boat as in claim 47 wherein the first lifting strake has a first section disposed on a first plane and a second section disposed on a second plane that is different relative to the first plane of the first section and the second lifting strake has a first section disposed on a third plane and a second section disposed on a fourth plane that is different relative to the third plane of the first section.

50. A tunnel-hulled boat comprising:

a hull having a top side, a bottom side, a fore, an amidships, and an aft;

a transom attached to the hull proximate the aft;

a generally concave tunnel, having a first side, a second side, a first end and a second end, disposed within the hull and extending rearwardly from the amidships;

a first bevel, having a first end and a second end, disposed along the first side;

a second bevel, having a first end and a second end, disposed along the second side;

a first sponson having a first end attached to the transom proximate the second end of the first bevel and a second end; and a second sponson having a first end attached to the transom proximate the second end of the second bevel and a end.

51. The tunnel-hulled boat as in claim 50 wherein the degree of concavity of the tunnel increases from the first end to the second end.

52. The tunnel-hulled boat as in claim 50 wherein the first end is generally square.

53. The tunnel-hulled boat as in claim 50 wherein the cross-section of the first bevel increases from the first bevel's first end to the first bevel's second end and the cross-section of the second bevel increases from the second bevel's first end to the second bevel's second end.

54. The tunnel-hulled boat as in claim 50 wherein the second end is notched.

55. The tunnel-hulled boat as in claim 54 wherein the notch is generally V-shaped.

56. The tunnel-hulled boat as in claim 50 further comprising:

a third bevel disposed within the first bevel proximate the first bevel's second end; and a fourth bevel disposed within the second bevel proximate the second bevel's second end.

57. The tunnel-hulled boat as in claim 50 wherein the second end of the first sponson and the second end of the second sponson are each diagonally disposed relative to the amidships.

58. The tunnel-hulled boat as in claim 50 wherein the tunnel has a first buoyancy volume and the first sponson and the second sponson have a combined second buoyancy volume that is at least as great as the first volume.

59. The tunnel-hulled boat as in claim 57 further comprising:

a third bevel disposed between the first bevel and the first sponson; and a fourth bevel disposed between the second bevel and the second sponson.

60. The tunnel-hulled boat as in claim 50 further comprising an aeration means for proving aeration for the tunnel.

61. The tunnel-hulled boat as in claim 60 wherein the aeration means comprises:

a plurality of first apertures disposed within the hull proximate the first end;

a cover having at least one second aperture, positioned over the plurality of first apertures, attached to the top side;

at least one first tube attached to the cover and registerable with a respective one of the at least one second aperture; and at least one second tube having a first end that is open and a second end attached in air flow connection with each of the at least one first tube.

62. The tunnel-hulled boat as in claim 61 wherein each of the plurality of first apertures is diagonally disposed relative to the amidships.

63. The tunnel-hulled boat as in claim 52 further comprising:

a first lifting strake, having a first end and a second end, extending along the hull in spaced apart relation to the first side; and a second lifting strake, having a first end and a second end, extending along the hull in spaced apart relation to the second side.

64. The tunnel-hulled boat as in claim 63 wherein the first end of the first lifting strake and the first end of the second lifting strake are each rounded.

65. The tunnel-hulled boat as in claim 63 wherein the first lifting strake has a first section disposed on a first plane and a second section disposed on a second plane that is different relative to the first plane of the first section and the second lifting strake has a first section disposed on a third plane and a second section disposed on a fourth plane that is different relative to the third plane of the first section.

66. A tunnel-hulled boat comprising:

a hull having a top side, a bottom side, a fore, an amidships, and an aft;

a transom attached to the hull proximate the aft;

a generally concave tunnel, having a first side, a second side, a first end and a second end, disposed within the hull and extending rearwardly from the amidships;

a first bevel, having a first end and a second end, disposed along the first side;

a second bevel, having a first end and a second end, disposed along the second side;

a first lifting strake, having a first end that is rounded and a second end, extending along the hull in spaced apart relation to the first side; and a second lifting strake, having a first end that is rounded and a second end, extending along the hull in spaced apart relation to the second side.

67. The tunnel-hulled boat as in claim 66 wherein the degree of concavity of the tunnel increases from the first end to the second end.

68. The tunnel-hulled boat as in claim 66 wherein the first end is generally square.

69. The tunnel-hulled boat as in claim 66 wherein the cross-section of the first bevel increases from the first bevel's first end to the first bevel's second end and the cross-section of the second bevel increases from the second bevel's first end to the second bevel's second end.

70. The tunnel-hulled boat as in claim 66 wherein the second end is notched.

71. The tunnel-hulled boat as in claim 70 wherein the notch is generally V-shaped.

72. The tunnel-hulled boat as in claim 66 further comprising:

a third bevel disposed within the first bevel proximate the first bevel's second end; and a fourth bevel disposed within the second bevel proximate the second bevel's second end.

73. The tunnel-hulled boat as in claim 66 further comprising:

a first sponson having a first end attached to the transom proximate the second end of the first bevel and a second end; and a second sponson having a first end attached to the transom proximate the second end of the second bevel and a end.

74. The tunnel-hulled boat as in claim 73 wherein the second end of the first sponson and the second end of the second sponson are each diagonally disposed relative to the amidships.

75. The tunnel-hulled boat as in claim 73 wherein the tunnel has a first buoyancy volume and the first sponson and the second sponson have a combined second buoyancy volume that is at least as great as the first volume.

76. The tunnel-hulled boat as in claim 74 further comprising:

a third bevel disposed between the first bevel and the first sponson; and a fourth bevel disposed between the second bevel and the second sponson.

77. The tunnel-hulled boat as in claim 66 further comprising an aeration means for proving aeration for the tunnel.

78. The tunnel-hulled boat as in claim 77 wherein the aeration means comprises:

a plurality of first apertures disposed within the hull proximate the first end;

a cover having at least one second aperture, positioned over the plurality of first apertures, attached to the top side;

at least one first tube attached to the cover and registerable with a respective one of the at least one second aperture; and at least one second tube having a first end that is open and a second end attached in air flow connection with each of the at least one first tube.

79. The tunnel-hulled boat as in claim 78 wherein each of the plurality of first apertures is diagonally disposed relative to the amidships.

80. The tunnel-hulled boat as in claim 68 wherein the first lifting strake has a first section disposed on a first plane and a second section disposed on a second plane that is different relative to the first plane of the first section and the second lifting strake has a first section disposed on a third plane and a second section disposed on a fourth plane that is different relative to the third plane of the first section.

81. A tunnel-hulled boat comprising:

a hull having a top side, a bottom side, a fore, an amidships, and an aft;

a transom attached to the hull proximate the aft;

a generally concave tunnel, having a first side, a second side, a first end and a second end, disposed within the hull and extending rearwardly from the amidships;

a first bevel, having a first end and a second end, disposed along the first side;

a second bevel, having a first end and a second end, disposed along the second side;

a first lifting strake, having a first end and a second end, extending along the hull in spaced apart relation to the first side; and a second lifting strake, having a first end and a second end, extending along the hull in spaced apart relation to the second side; and wherein the first lifting strake has a first section disposed on a first plane and a second section disposed on a second plane that is different relative to the first plane of the first section and the second lifting strake has a first section disposed on a third plane and a second section disposed on a fourth plane that is different relative to the third plane of the first section.

82. The tunnel-hulled boat as in claim 81 wherein the degree of concavity of the tunnel increases from the first end to the second end.

83. The tunnel-hulled boat as in claim 81 wherein the first end is generally square.

84. The tunnel-hulled boat as in claim 81 wherein the cross-section of the first bevel increases from the first bevel's first end to the first bevel's second end and the cross-section of the second bevel increases from the second bevel's first end to the second bevel's second end.

85. The tunnel-hulled boat as in claim 81 wherein the second end is notched.

86. The tunnel-hulled boat as in claim 85 wherein the notch is generally V-shaped.

87. The tunnel-hulled boat as in claim 81 further comprising:

a third bevel disposed within the first bevel proximate the first bevel's second end; and a fourth bevel disposed within the second bevel proximate the second bevel's second end.

88. The tunnel-hulled boat as in claim 81 further comprising:

a first sponson having a first end attached to the transom proximate the second end of the first bevel and a second end; and a second sponson having a first end attached to the transom proximate the second end of the second bevel and a end.

89. The tunnel-hulled boat as in claim 88 wherein the second end of the first sponson and the second end of the second sponson are each diagonally disposed relative to the amidships.

90. The tunnel-hulled boat as in claim 88 wherein the tunnel has a first buoyancy volume and the first sponson and the second sponson have a combined second buoyancy volume that is at least as great as the first volume.

91. The tunnel-hulled boat as in claim 89 further comprising:
- a third bevel disposed between the first bevel and the first sponson; and
- a fourth bevel disposed between the second bevel and the second sponson.

92. The tunnel-hulled boat as in claim 81 further comprising an aeration means for proving aeration for the tunnel.

93. The tunnel-hulled boat as in claim 92 wherein the aeration means comprises:
- a plurality of first apertures disposed within the hull proximate the first end;
- a cover having at least one second aperture, positioned over the plurality of first apertures, attached to the top side;
- at least one first tube attached to the cover and registerable with a respective one of the at least one second aperture; and
- at least one second tube having a first end that is open and a second end attached in air flow connection with each of the at least one first tube.

94. The tunnel-hulled boat as in claim 93 wherein each of the plurality of first apertures is diagonally disposed relative to the amidships.

95. The tunnel-hulled boat as in claim 83 wherein the first end of the first lifting strake and the first end of the second lifting strake are each rounded.

* * * * *